US011773263B2

(12) United States Patent
Licheri et al.

(10) Patent No.: US 11,773,263 B2
(45) Date of Patent: Oct. 3, 2023

(54) CARBOXYLATED VINYL ACETATE/ETHYLENE COPOLYMER DISPERSIONS AND USES THEREOF

(71) Applicant: Celanese International Corporation, Irving, TX (US)

(72) Inventors: Cristiana Licheri, Altopascio-Lucca (IT); Alistair John McLennan, Konigstein (DE); Ivan Rossi, Cardano al Compo (IT); Paul Alexander Scott, Stoneleigh Epsom (GB)

(73) Assignee: Celanese International Corporation, Irving, TX (US)

(*) Notice: Subject to any disclaimer, the term of this patent is extended or adjusted under 35 U.S.C. 154(b) by 0 days.

(21) Appl. No.: 17/389,796

(22) Filed: Jul. 30, 2021

(65) Prior Publication Data

US 2021/0363350 A1 Nov. 25, 2021

Related U.S. Application Data

(62) Division of application No. 16/082,565, filed as application No. PCT/US2016/065057 on Dec. 6, 2016, now Pat. No. 11,214,684.

(30) Foreign Application Priority Data

Dec. 9, 2015 (DE) .......................... 102015015907.0

(51) Int. Cl.
| | | |
|---|---|---|
| *D04H 1/64* | (2012.01) | |
| *D04H 1/587* | (2012.01) | |
| *C08L 77/00* | (2006.01) | |
| *C08L 23/08* | (2006.01) | |
| *C08L 79/02* | (2006.01) | |
| *C08F 218/08* | (2006.01) | |
| *C08G 59/32* | (2006.01) | |
| *C08L 31/04* | (2006.01) | |
| *C09D 131/04* | (2006.01) | |
| *C08G 73/02* | (2006.01) | |

(52) U.S. Cl.
CPC ............ *C08L 79/02* (2013.01); *C08F 218/08* (2013.01); *C08G 59/3227* (2013.01); *C08G 73/022* (2013.01); *C08L 23/0853* (2013.01); *C08L 31/04* (2013.01); *C08L 77/00* (2013.01); *C09D 131/04* (2013.01); *D04H 1/587* (2013.01); *D04H 1/64* (2013.01); *D04H 1/641* (2013.01); *C08L 2201/56* (2013.01); *C08L 2203/12* (2013.01); *D10B 2321/021* (2013.01); *D10B 2321/08* (2013.01); *D10B 2331/02* (2013.01); *D10B 2401/06* (2013.01)

(58) Field of Classification Search
CPC ........ D04H 1/641; D04H 1/587; C08L 77/00; C08L 23/0853; C08L 2203/12; D10B 2401/06; D10B 2321/021; D10B 2331/02; D10B 2321/08
See application file for complete search history.

(56) References Cited

U.S. PATENT DOCUMENTS

| | | | |
|---|---|---|---|
| 4,008,301 A | 2/1977 | Arisaka et al. | |
| 4,121,966 A | 10/1978 | Amano et al. | |
| 4,271,258 A | 6/1981 | Watariguchi | |
| 4,859,527 A | 8/1989 | DiStefano | |
| 5,217,455 A | 6/1993 | Tan | |
| 5,633,334 A | 5/1997 | Walker et al. | |
| 5,716,703 A | 2/1998 | Payne | |
| 7,138,561 B2 | 11/2006 | Fuchs et al. | |
| 7,189,307 B2 | 3/2007 | Goulet et al. | |
| 7,678,856 B2 * | 3/2010 | Goulet | D21H 27/008 524/500 |
| 7,767,598 B2 | 8/2010 | Schneider et al. | |
| 7,786,341 B2 | 8/2010 | Schneider et al. | |
| 2012/0028527 A1 | 2/2012 | Boylan et al. | |

FOREIGN PATENT DOCUMENTS

| | | |
|---|---|---|
| CN | 1198489 | 11/1998 |
| CN | 1208062 | 2/1999 |
| CN | 1440473 | 9/2003 |
| CN | 101541862 | 9/2009 |
| CN | 101932416 | 12/2010 |
| EP | 0622433 | 11/1994 |
| EP | 1180559 | 2/2002 |
| JP | 06263991 | 9/1994 |
| JP | 2007031871 | 2/2007 |
| WO | 200204133 | 1/2002 |

(Continued)

OTHER PUBLICATIONS

Solenis, Kymene Wet-Strength Resin Innovations, Year: 2000 (Year: 2000).*
Notification to Grant Patent Right dated Jan. 6, 2022 for CN 201680079143.3 by the China National Intellectual Property Administration, all pages. This Notification is in the Chinese language.
Decision to Grant a European patent pursuant to Article 97(1) EPC for Patent No. 3387176 to be published on Jan. 26, 2022, all pages.
"Kymene Wet-Strength Resin Innovations", Solenis, Available Online at: https://languages.solenis.com/application/files/5915/2425/5584/170053-PC-KymeneBrochureWB.pdf, 2017, 8 pages.
U.S. Appl. No. 16/082,565, Final Office Action, dated May 13, 2021, 9 pages.

(Continued)

*Primary Examiner* — Robert D Harlan
(74) *Attorney, Agent, or Firm* — Kilpatrick Townsend & Stockton LLP

(57) ABSTRACT

The present invention relates to preparation of heterogeneous mixtures of (carboxylated) vinyl ester/ethylene dispersions, such as vinyl acetate/ethylene (VAE) dispersions with polyamideamine-epichlorohydrin (PAE) wet strength resins having a reduced amount of halogenated organic compounds, such as less than 1500 ppm. The dispersion offers extremely low free and bound formaldehyde levels combined with wet tensile strength for use in non-woven textile and paper applications.

13 Claims, No Drawings

(56) References Cited

FOREIGN PATENT DOCUMENTS

WO  2013072713  5/2013
WO  2017100152  6/2017

OTHER PUBLICATIONS

U.S. Appl. No. 16/082,565 , Non-Final Office Action, dated Jan. 21, 2021, 7 pages.
U.S. Appl. No. 16/082,565 , Notice of Allowance, dated Aug. 30, 2021, 10 pages.
U.S. Appl. No. 16/082,565 , Notice of Allowance, dated Jul. 27, 2021, 11 pages.
Application No. CN201680079143.3 , Office Action, dated Jul. 12, 2021, 12 pages.
Application No. CN201680079143.3 , Office Action, dated Sep. 17, 2020, 25 pages.
Application No. EP16822810.4 , Office Action, dated Nov. 27, 2020, 3 pages.
Application No. EP16822810.4 , Office Action, dated Feb. 11, 2020, 5 pages.
Application No. PCT/US2016/065057 , International Preliminary Report on Patentability, dated Jun. 21, 2018, 10 pages.
Application No. PCT/US2016/065057 , International Search Report and Written Opinion, dated Feb. 16, 2017, 12 pages.
Notification of the First Office Action dated Jan. 12, 2023 for China Appln No. 202210076743.1, all pages.

\* cited by examiner

CARBOXYLATED VINYL ACETATE/ETHYLENE COPOLYMER DISPERSIONS AND USES THEREOF

CROSS REFERENCE TO RELATED APPLICATION

This application is a divisional of U.S. patent application Ser. No. 16/082,565 filed Sep. 6, 2018, which is a U.S. National Phase of PCT/US2016/065057, filed Dec. 6, 2016, which claims priority to German Patent Application DE 102015015907.0, filed on Dec. 9, 2015, the entireties of which are incorporated herein by reference.

FIELD OF THE INVENTION

The present invention relates to the preparation of emulsion polymer-based binders comprising a vinyl ester/ethylene copolymer containing copolymerized carboxylic acid groups or salts thereof blended with a wet strength polyamidoamine-epichlorohydrin, (PAE), resin. This binder composition provides fibrous substrates with wet-strength and yields very low levels of both free and bound formaldehyde. Fibrous substrates that benefit from the use of such binder and finishing compositions include non-woven substrates, such as paper products and absorbent structures for personal care products, non-woven fabric and textiles.

BACKGROUND OF THE INVENTION

Non-woven materials and other fibrous products consist of a loosely assembled mass of fibers which can be bound together with a polymeric binder to form a self-sustaining web or substrate. Such webs or substrates can be used to produce many items such as consumer paper towels, disposable wipes, absorbent media for feminine hygiene applications and diapers, medical drapes, table-cloths, and high-grade napkins. The strength of the non-woven substrate used, and especially wet tensile strength, is an important property in many applications.

One way to improve the tensile strength of a non-woven substrate is through the incorporation of cross-linking co-monomers into the polymeric material, e.g., emulsion copolymers, used as the substrate binder or finishing agent. The cross-linking co-monomers are capable of self-cross-linking between polymer chains after application to the non-woven substrate and upon drying or curing of the polymeric binder or finishing agent. The most widely used cross-linking co-monomer in such applications is N-methylol acrylamide (NMA).

There are two potential problems which can arise when using binder or finishing compositions wherein an emulsion polymer of the composition contains cross-linking co-monomers. First, there is an upper limit to the amount of the cross-linking co-monomer that can be incorporated to produce a useful binder or finishing agent using currently available processing technology. Second, the N-methylol acrylamide (NMA) typically used as cross-linking co-monomer is a recognized source of formaldehyde, which is undesirable in most applications.

Elimination or minimization of cross-linking co-monomers such as NMA in the emulsion polymers used can provide binder and finishing compositions which yield lower formaldehyde levels. But such elimination or minimization of cross-linking capability lowers the copolymer molecular weight which can in turn diminish the wet tensile strength which the binder or finishing agent imparts to the substrates treated therewith.

U.S. Pat. No. 4,859,527 discloses the use of PAE resins in non-wovens. However, the method disclosed was to pretreat cellulosic fibers with an adhesion promoting additive, which included PAE resins amongst its embodiments, and to later bond the fibers together with a polymeric binder. It does not teach using a blend of VAE dispersion containing copolymerized carboxyl groups (carboxylated VAE) with a specially selected PAE resin to bind the non-woven fibers to avoid free or bound formaldehyde in the final non-woven article.

WO 2002/04133A2 discloses an aqueous composition comprising a water-soluble component comprising at least one functional group that undergoes a crosslinking reaction, a film-forming polymer and a component that provides vapour or moisture barrier properties. PAE resins are disclosed in claim 2 of said application.

U.S. Pat. No. 7,189,307 discloses a system to impart wet strength to soft, absorbent paper sheets, by topically applying to one or both surfaces a cured binder composition. The cured binder composition comprises a carboxylated vinyl acetate terpolymer, and an epoxy functional polymer. The epoxy functional polymer includes the kymene type of resins. The invention focuses on reducing formaldehyde emissions, not on eliminating free and bound formaldehyde.

Given the foregoing considerations, there is a continuing need to identify new binder and finishing compositions for non-woven substrates which can be used to provide treated substrates that are very low in formaldehyde content, i.e., less than 5 ppm bound and free, but which nevertheless possess desirably high tensile, particularly wet tensile, strength. It has been found that selected types of cross-linker-free emulsion polymers can be blended with other selected types of polymers to realize aqueous binder and finishing compositions which provide non-woven and other fibrous substrates having this desirable combination of features.

BRIEF SUMMARY OF THE INVENTION

This invention is directed to aqueous based polymer dispersions for use in paper, textile and non-woven applications that deliver wet strength without releasing free and/or bound formaldehyde, the latter under severe test conditions of acidic steam distillation.

In one aspect, the present invention is directed to low-formaldehyde binder and finishing compositions for non-woven substrates and textiles. Such compositions comprise a dispersion of a vinyl ester/ethylene copolymer containing copolymerized carboxylic acid groups or salts thereof, blended with a wet strength polyamido-amine epichlorohydrin resin, (PAE). The vinyl ester/ethylene copolymer dispersion is free of reactive N-methylol acrylamide groups. The PAE is a second or a later generation of polyamidoamine-epichlorohydrin resins with reduced levels of halogenated organic compounds (AOX) of below 0.60 wt. %, e.g., below 0.50 wt. % or below 0.20 wt. %. The weight ratio of the vinyl ester/ethylene copolymer to the PAE resin is from 95:5 to 20:80. The pH is greater than 3.5, e.g., greater than 6, greater than 7, or greater than 7.5.

The vinyl ester/ethylene copolymer may contain from 5 to 35 wt. %, preferably from 10 to 30 wt. %, more preferably from 15 to 25 wt. % of units derived from ethylene. In some embodiments, the vinyl ester component of the copolymer comprises a vinyl ester of a $C_1$-$C_3$ saturated carboxylic acid and is preferably vinyl acetate.

In another aspect, the present development is directed to a composition produced by blending the vinyl acetate/ethylene copolymer (VAE) dispersion and a PAE resin. The present development is also directed to using the composition as a binder for textile or non-woven substrate, and the composition has been applied to one or both sides of the textile or non-woven fabric and then cured.

In yet another aspect, the present development is directed to a latex-bonded non-woven material comprising a substrate that is bonded with a polymer binder comprising a vinyl acetate/ethylene (VAE) copolymer containing copolymerized carboxylic acid groups or salts thereof, and a PAE resin. The non-woven material has a wet tensile strength value of at least 35%, preferably 40% of its dry tensile strength value, and the material has a bound formaldehyde content of less than 5 ppm as determined by the VdL-RL03 (1997-05) method. In preferred embodiments of this aspect, the weight ratio of dried VAE/PAE blend to the weight of the fibers is from 3 to 30 wt. %, preferably from 5 to 20 wt. %, more preferably from 10 to 15 wt. %; and/or the weight ratio of the vinyl ester/ethylene copolymer to PAE resin is from 95:5 to 20:80; and/or the wet/dry tensile strength ratio of the material is at least 40%, preferably at least 45% and the bound formaldehyde is less than 5 ppm, preferably 1 ppm or less.

The PAE resin used in the present development is a Generation 2, Generation 2.5, or Generation 3 PAE (G2, G2.5 or G3 PAE), more preferably a G2.5 or G3 PAE, and is an aqueous solution with solids content from 12.5 to 30%, wherein the level of undesired byproducts has been reduced such that the level of 1,3-dichloropropanol, (DCP) is below 700 ppm, preferably below 500 ppm, more preferably below 150 ppm, most preferably below 50 ppm, the level of 3-monochloropropan-1,2-diol, (MCPD), is below 600 ppm, preferably below 500 ppm, more preferably below 400 ppm and most preferably below 50 ppm and the AOX level is below 1500 ppm, preferably below 800 ppm.

The VAE copolymer used in the present development preferably comprises 0.1 to 10 wt. %, more preferably 0.25 to 5 wt. %, or 0.5 to 2.5 wt. % of units derived from at least one ethylenically unsaturated acid monomer and/or anhydride thereof and/or salt thereof. Preferably, the ethylenically unsaturated acid is an α-β unsaturated mono- or di-carboxylic acid containing 3 to 8 carbon atoms. Preferably, the α-β unsaturated mono- or di-carboxylic acid monomer is one or more of acrylic acid, methacrylic acid, crotonic acid, itaconic acid, maleic acid and C1 to C12 mono-alkyl esters of itaconic or maleic acid. The vinyl ester/ethylene copolymer is preferably substantially free of anionic surfactants, wherein substantially free means less than 2 wt. % of anionic surfactant on an active basis, preferably less than 1 wt. %. The VAE copolymer may also comprise a protective colloid, or a combination of a colloid and non-ionic surfactant. The VAE copolymer of the polymer binder is substantially free of N-methylol acrylamide and alkyl esters of N-methylol acrylamide.

In yet another aspect, the present development is directed to the textiles, or personal care articles, or industry or household cleaning cloth incorporating non-woven material described above.

DETAILED DESCRIPTION OF THE INVENTION

The compositions described herein are useful as binders for non-woven substrates such as fibrous webs and also as finishing agents for textiles and non-woven fabrics. Such compositions comprise two types of polymeric materials which are combined to form these compositions. The compositions are then applied to the non-woven substrates, textiles or non-woven fabrics and subsequently cured. In some aspects, the non-woven substrates, textiles or non-woven fabrics are used in a food contacting application. The present invention has combined the use of a dispersion with a PAE resin to form a new binder by taking a non-cross-linking vinyl acetate/ethylene (VAE) copolymer, e.g., a dispersion not containing any reactive N-methylol acrylamide groups, and blending it with a food contact approved polyamidoamine-epichlorohydrin wet strength agent. The vinyl ester/ethylene (emulsion) copolymer, e.g., the VAE (emulsion) copolymer, disclosed herein contains carboxyl groups from the copolymerization of unsaturated carboxylic acid monomers, and is stabilized primarily with nonionic surfactants.

In some embodiments, the present invention is directed to a low-formaldehyde containing dispersion of a vinyl ester/ethylene copolymer containing copolymerized carboxylic acid groups or salts thereof blended with a wet strength polyamidoamine-epichlorohydrin, (PAE) resin; wherein: a) the vinyl ester/ethylene copolymer dispersion is free of reactive N-methylol acrylamide groups; and b) the PAE comprises less than 1500 ppm halogenated organic compounds, (AOX); c) the weight ratio of the vinyl ester/ethylene copolymer to the PAE resin is from 95:5 to 20:80; and d) the pH is greater than 6, preferably greater than 7, more preferably greater than 7.5. The composition formed by the blending of the low-formaldehyde containing dispersion with the PAE may be used as a binder for a textile or non-woven substrate, and may be applied to one or both sides of the substrate, followed by curing. In further embodiments, the composition is a polymer binder that is used to bond a substrate for a latex-bonded non-woven material comprising the substrate.

I. THE VINYL ESTER/ETHYLENE COPOLYMER

One essential polymeric component of the aqueous binder or finishing compositions applied to the non-woven substrates(s) herein comprises a vinyl ester/ethylene emulsion copolymer. Preferred emulsion polymers of this type are emulsion copolymers which comprise at least two different non-functional main co-monomers which, along with appropriately selected optional functional co-monomers, and which have been emulsion polymerized to form an aqueous copolymer dispersion or latex.

Emulsion Polymer Monomers

One preferred type of primary non-functional monomer for use in forming this composition component comprises vinyl ester co-monomers. Examples thereof are vinyl esters of monocarboxylic acids having one to eighteen, preferably one to thirteen carbon atoms, e.g. vinyl formate, vinyl acetate, vinyl propionate, vinyl butyrate, vinyl isobutyrate, vinyl benzoate, vinyl-2-ethyl-hexanoate, vinyl esters of an [alpha]-branched carboxylic acid having 5 to 11 carbon atoms in the acid moiety, e.g., versatic acids which form vinyl esters such as VeoVa 9, VeoVa 10, and VeoVa 11, and the vinyl esters of pivalic, 2-ethylhexanoic, lauric, palmitic, myristic, and stearic acid. Vinyl acetate is the preferred main monomer for use in preparing the vinyl emulsion polymer component of the compositions herein.

Vinyl acetate and ethylene as the main co-monomers can also be copolymerized with other types of co-monomers:

non-functional co-monomers, such as other vinyl ester monomers or alkyl esters of acrylic or methacrylic acid, and functional co-monomers, such as unsaturated sulphonic acid or unsaturated carboxylic acid monomers or their salts to form vinyl acetate-ethylene (VAE) co- or ter-polymers, which are especially useful in the binder and finishing compositions herein. In some embodiments, the ethylenically unsaturated acid comprises an α-β unsaturated mono- or di-carboxylic acid, preferably, an α-β unsaturated mono- or di-carboxylic acid that contains 3 to 8 carbon atoms. In preferred embodiments, the unsaturated mono- or di-carboxylic acid is one or more of acrylic acid, methacrylic acid, crotonic acid, itaconic acid, maleic acid and C1 to C12 mono-alkyl esters of itaconic or maleic acid. In preferred VAE copolymers, the primary vinyl acetate co-monomer is generally present in the copolymer in amounts from 60 to 90 wt. %, e.g., from 70 to 85 wt. %, based on the total weight main co-monomers in the copolymer. Ethylene is generally present in the copolymer in amounts from 4 to 40 wt. %, e.g., from 5 to 35 wt. %, from 10 to 30 wt. %, or from 15 to 25 wt. %, based on the total weight of the main co-monomers in this preferred type of VAE emulsion copolymer. The unsaturated carboxylic acid will generally be present in amounts from 0.1 to 10 wt. %, e.g., from 0.25 to 5 wt. %, or from 0.5 to 2.5 wt. %, based on the total main co-monomers in this preferred type of VAE emulsion copolymer.

The carboxylated vinyl ester/ethylene emulsion polymers used in binder/finishing compositions herein can also optionally contain relatively minor amounts of other types of co-monomers besides the main co-monomer types, i.e., vinyl ester, e.g., vinyl acetate, ethylene or unsaturated carboxylic acid co-monomer types. Such other optional co-monomers will frequently be those which contain one or more functional groups which can additionally stabilize the polymer dispersion or and can serve to provide or facilitate cross-linking between copolymer chains within a copolymer dispersion-containing aqueous composition, or upon the drying or curing of binders or finishing agent compositions.

One type of functional co-monomer which should not be incorporated into vinyl ester emulsion copolymers used herein comprises any co-monomer which contains cross-linkable moieties that generate formaldehyde upon curing of the binder or finishing agent compositions containing such copolymers. Thus the vinyl ester/ethylene copolymer in the dispersion should be substantially free of such co-monomers, which include, for example, common cross-linkers like N-methylol acrylamide (NMA) including low formaldehyde versions of N-methylol acrylamide such as NMA-LF.

Stabilizers for the Carboxylated Vinyl Ester/Ethylene Polymer Dispersions

Both during polymerization and thereafter, the emulsion polymers used to prepare the aqueous binder or finishing agents compositions herein are generally stabilized in the form of an aqueous polymer dispersion or latex. The polymer dispersion therefore will be prepared in the presence of and will contain a stabilization system which generally comprises surfactants, in particular nonionic surfactants. Mixtures of nonionic and anionic surfactants can also be employed.

The amount of surfactants employed will generally be at least 0.5 wt. %, based on the total quantity of main monomers in the polymer dispersion. Generally surfactants can be used in amounts up to 8 wt. %, based on the total quantity of main monomers in the polymer dispersion. Preferably, the surfactants used to stabilize the polymer dispersions comprises primarily nonionic surfactants, e.g. the weight ratio of nonionic to anionic surfactants may fluctuate within ranges, between 2:1 and 50:1 preferably when anionic surfactants are present. In some preferred embodiments, the carboxylated vinyl ester/ethylene emulsion dispersion is substantially free i.e., comprising less than 2 wt. %, or less than 1 wt. % of anionic surfactant on an active basis (i.e., dry surfactant excluding water and other salts or byproducts). The use of the primarily nonionic surfactants as stabilizers can avoid stability problems that may occur when the dispersion is blended with PAE resin, a cationic resin, which is described in sections below.

Surfactants employed with preference in preparing the emulsion polymers herein are nonionic surfactants having alkylene oxide groups and/or anionic surfactants having sulfate, sulfonate, phosphate and/or phosphonate groups. Such surfactants, if desired, can be used together with water-soluble polymers, preferably together with polyvinyl alcohol or hydroxyethyl cellulose. Preferably, the surfactants contain no alkylphenolethoxylates (APEO).

Examples of suitable nonionic surfactants include acyl, alkyl, oleyl, and alkylaryl ethoxylates. These products are commercially available, for example, under the names Genapol Lutensol®, Emulan® or Emulsogen®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{12}$-$C_{14}$ fatty alcohol (3-40) ethoxylates, linear and branched $C_{11}$ oxo-process alcohol (3-40) ethoxylates, $C_3$-$C_{15}$ oxo-process alcohol (3-40) ethoxylates, $C_{16}$-$C_{18}$ fatty alcohol (11-80) ethoxylates, $C_{10}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10 wt %, the polyethylene oxide (4-40) ethers of oleyl alcohol, and the polyethylene oxide (4-40) ethers of nonylphenol. Particularly suitable are the polyethylene oxide (10-40) ethers of $C_n$ alkyl alcohols, an alcohol ethoxylate nonionic surfactant, e.g., EmulsogenV EPN 287, Clariant GmbH, Functional Chemicals, Germany.

The amount of nonionic surfactants used in preparing the emulsion polymer dispersions used herein is typically from 1 to 8 wt. %, preferably from 1 to 6 wt. %, more preferably from 2% to 6 wt. %, based on the total main monomer quantity. Mixtures of nonionic surfactants can also be employed.

Examples of suitable anionic surfactants include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, dimethyl-dialkyl (Cs-Cis) ammonium chloride, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium lauryl sulfate, sulfated alkyl or aryl ethoxylate with EO degree between 1 and 10, for example ethoxylated sodium lauryl ether sulfate (EO degree 3) or a salt of a monoester or diester, preferably of a C4-C8 Cis alkyl ester, of a sulfonated dicarboxylic acid having 4 to 8 carbon atoms, or a mixture of these salts, preferably sulfonated salts of esters of succinic acid, more preferably salts, such as alkali metal salts, of mono- or bis-C4-C8 is alkyl esters of sulfonated succinic acid, or phosphates of polyethoxylated alkanols or alkylphenols.

When present, the amount of anionic surfactants used can typically range from 0.001 to 2.0 wt. %, preferably from 0.1 to 1.0 wt. %, more preferably from 0.25% to 0.75 wt. %, based on the total main monomer quantity. Mixtures of anionic surfactants can also be employed.

The vinyl ester emulsion polymer dispersions may further comprise small amounts of polymeric stabilizers (protective colloids). Protective colloids, if used, are generally present only in comparatively low concentrations, e.g., up to 3 wt. %, based on the total amount of the main monomers used. The vinyl ester dispersions employed herein will more preferably contain no protective colloids or only up to 1 wt. % protective colloids, based on the total amount of the main monomers employed in the emulsion polymer.

Examples of suitable protective colloids include water-soluble or water-dispersible polymeric modified natural substances, such as cellulose ethers, examples being methyl-, ethyl-, hydroxyethyl- or carboxymethyl cellulose, water-soluble or water-dispersible polymeric synthetic substances, such as polyvinylpyrrolidone or polyvinyl alcohols (with or without residual acetyl content), and polyvinyl alcohol which is partially esterified or acetalized or etherified with saturated radicals, and also with different molecular weights.

The protective colloids can be used individually or in combination. In the case of combinations, the two or more colloids can each differ in their molecular weights or they can differ in their molecular weights and in their chemical composition, such as the degree of hydrolysis, for example.

In addition to the surfactants and, if appropriate, protective colloids that are used during the emulsion polymerization of the emulsion polymers herein, it is also possible for the polymer dispersions used herein to contain subsequently added water-soluble or water-dispersible polymers as hereinafter described. Additional surfactants may also be added to the dispersions post-polymerization.

Emulsion Polymer Preparation

The polymer dispersions comprising the vinyl ester/ethylene copolymer dispersions described herein can be prepared using emulsion polymerization procedures which result in the preparation of polymer dispersions in aqueous latex form. Such preparation of aqueous polymer dispersions of this type is well known and has already been described in numerous instances and is therefore known to the skilled artisan. Such procedures are described, for example, in The U.S. Pat. No. 5,633,334, and in the *Encyclopedia of Polymer Science and Engineering*, Vol. 8, p. 659 ff (1987). The disclosures of both of these publications are incorporated herein by reference in their entirety.

The polymerization may be carried out in any manner knownper se in one, two or more stages with different monomer combinations, giving polymer dispersions having particles with homogeneous or heterogeneous, e.g., core shell or hemispheres, morphology. Any reactor system such as batch, loop, continuous, cascade, etc., may be employed.

The polymerization temperature generally ranges from 20° C. to 150° C., more preferably from 50° C. to 120° C. The polymerization generally takes place under pressure if appropriate, preferably from 2 to 150 bar, more preferably from 10 to 100 bar.

In a typical polymerization procedure involving, for example, vinyl acetate/ethylene copolymer dispersions, the vinyl acetate, ethylene, stabilizing system and other co-monomers can be polymerized in an aqueous medium under pressures up to 150 bar in the presence of one or more initiators. The aqueous reaction mixture in the polymerization vessel can be maintained by a suitable buffering agent at a pH of 3 to 7.

The manner of combining the several polymerization ingredients, i.e., stabilizing system, co-monomers, initiator system components, etc., can vary widely. Generally an aqueous medium containing at least part of the stabilizing system can be initially formed in a polymerization vessel with the various other polymerization ingredients being added to the vessel thereafter.

Co-monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer may be pumped into the polymerization vessel and maintained under appropriate pressure therein.

It is possible for the total amount of redox initiator system to be included in the initial charge to the reactor at the beginning of the polymerization. Preferably, however, a portion of the initiator is included in the initial charge at the beginning, and the remainder is added after the polymerization has been initiated, in one or more steps or continuously. It is also possible to start the emulsion polymerization using a seed latex, for example with from 0.5 to 15 wt % of the polymerization mixture.

Carboxylated Vinyl Ester/Ethylene Copolymer Characteristics

The molecular weight of the various vinyl ester/ethylene polymers used in the polymer dispersions herein can be adjusted by adding small amounts of one or more molecular weight regulator substances. These regulators, as they are known, are generally used in an amount of up to 2 wt,%, based on the total co-monomers to be polymerized. As regulators, it is possible to use all of the substances known to the skilled artisan. Preference is given, for example, to organic thio compounds, silanes, allyl alcohols, and aldehydes.

The vinyl ester/ethylene polymer dispersions as prepared herein will generally have a viscosity which ranges from 20 mPas to 5000 mPas at 45-70% solids, more preferably from 50 mPas to 2000 mPas, most preferably 50-1000 mPas, measured with a Brookfield viscometer at 25° C., 20 rpm, with appropriate spindle, e.g., spindle 2. Viscosity may be adjusted by the addition of thickeners and/or water to the polymer dispersion. Suitable thickeners can include poly-acrylates or polyurethanes, such as Borchigel L75® and Tafigel PUR 60®. Alternatively, the polymer dispersion may be substantially free of thickeners.

The vinyl ester/ethylene polymer dispersions as prepared herein will generally have a (mid-point) glass transition temperature $T_g$, of from −25° C. to +30° C., preferably −15° C. to +10° C., most preferably −10° C. to +5° C. The dispersions will generally have a grit level below 0.1%, preferably below 0.01%

Following polymerization, the solids content of the resulting aqueous polymer dispersions can be adjusted to the level desired by the addition of water or by the removal of water by distillation. Generally, the desired level of polymeric solids content after polymerization is from 30 weight percent to 70 weight percent based on the total weight of the polymer dispersion, more preferably from 40 weight percent to 65 weight percent, most preferably from 50 weight percent to 60 weight percent.

Polyamidoamine-Epichlorohydrin Wet Strength Resin (PAE)

Polyamidoamineepichlorohydrin wet strength resin (PAE) (also popularly known as "kymene") is used in adjacent industries, e.g., the paper-making industry, to boost wet properties in the finished, (dry), paper product. PAE resins contain quaternary ammonium groups with the ability to adsorb onto negatively charged cellulose fibers, and azetidinium reactive groups that typically continue to cross-link as the paper dries and cures, thereby increasing wet properties upon storage. More specifically, PAE resins cure without formation or liberation of formaldehyde. Such chemistry has, in the past, typically not been compliant with the food contact regulations typically required by the non-wovens industry, specifically the German BfR section XIV. Recent innovations by PAE resin manufacturers have now resulted in a generation of products that are food contact compliant with low absorbable organic halogen, (AOX), levels, making them more suitable for use in the target industries currently utilizing methylol based cross-linking dispersions. PAE resins are commercially available from, for example, Mare spa or Solenis.

AOX levels are increased by all of the chlorine-containing by-products in the PAE manufacturing process, including 1,3-dichloropropanol (DCP), 3-monochloropropan-1,2-diol (3-MCPD), aminochlorohydrin (ACH), and polymer bound-1-chloro-2,3-propanediol (PB-CPD). Preferred PAEs to be used in the compositions disclosed herein are second or later generations, so called G2, G2.5, or G3 PAE resins that have reduced AOX levels, e.g., AOX levels below 0.60 wt. %, e.g., below 0.25 wt. %, below 0.20 wt. %, or below 800 ppm. PAE is normally supplied as an aqueous solution with solids content from 12.5 to 30% or from 15 to 25%. The level of undesired byproducts in the PAE disclosed herein has been reduced so that the level of 1,3-dichloropropanol (DCP) in the PAE is below 700 ppm, e.g., below 500 ppm, below 150 ppm, below 50 ppm; the level of 3-MCPD is below 600 ppm, e.g., below 500 ppm, below 400 ppm, or below 50 ppm. Non-limiting examples of PAE suitable for the purpose of the invention are Maresin PST 150, Maresin M1 and Maresin T35.

Polymer Binder Preparation

The polymer binder compositions disclosed herein are formed from a blend of the vinyl ester/ethylene copolymer containing the copolymerized carboxylic acid groups with a PAE resin, as described above. This blend can be prepared by combining the vinyl ester/ethylene copolymer and the aqueous emulsion of the PAE together in any suitable manner or device.

In combining these components to form the compositions herein, the weight ratio of the solid particles of said carboxylated vinyl ester/ethylene copolymer to the solid particles in the aqueous emulsion of PAE, within the blend, ranges from 95:5 to 20:80, preferably, from 85:15 to 30:70, more preferably from 75:25 to 40:60. In some embodiments, the weight ratio between the two is 50:50.

Other adjuvants may also be present in the binder and finishing agent compositions herein at concentrations which range from 0 to 2 wt. % on a dry basis. Other additives that may optionally be incorporated into the binder composition include, but are not limited to, suspension aids, thickening agents, parting agents, penetrating agents, wetting agents, thermal gelling agents, sizing agents, defoaming agents, foam suppressors, blowing agents, coloring agents, oxidation inhibitors, quenchers, antimicrobial agents, dispersants, antistatic agents, cross linking agents (to improve wet strength), dispersants, lubricants, plasticizers, pH regulators, flow modifiers, setting promoters, and water-proofing agents, and mixtures thereof. Any optional adjuvants which are added to the binder and finishing agent compositions herein should not add any significant amounts of free and/or bound formaldehyde.

Characteristics of the Binder

The solids content and viscosity of the binder and finishing agent compositions herein, which are aqueous in nature, can vary widely depending upon the type of non-woven substrate or textile to be treated therewith, the amount of binder or finishing agent composition to be applied, and the nature of the process and apparatus to be used in applying the composition. Furthermore, aqueous polymer dispersions used as fibre bonding agents are typically diluted with water prior to application to the fibres through a variety of methods including air-spray bonding, airless bonding, saturation and foaming. The non-volatile content of the carboxylated VAE dispersion can vary between 30 and 70%, more typically between 40 and 60%. The blend of VAE dispersion and PAE resin prior to application can vary between 5 and 40%, typically between 10 and 30% solids.

The compositions herein when used as a binder for non-woven substrates have especially low formaldehyde contents by virtue of containing no significant amount of components which can generate formaldehyde when the binder compositions are cured. Such compositions, however, can nevertheless still impart desirable tensile strength characteristics, both wet and dry, to such treated non-woven substrates. This is true even though the compositions contain no conventional wet strength-imparting cross-linking moieties of the type which tend to release formaldehyde upon composition curing.

Both of these composition properties can be quantified by means of the formaldehyde content and tensile strength testing described hereinafter in the Test Methods section. Illustrative examples which can be used to quantify free and bound formaldehyde involve application of binder at a 20 percent add-on to Whatman #1 CHR chromatography paper which is then oven dried for 15 minutes at 60° C. and cured for 20 seconds in one instance at 150° C. and in another instance at 200° C. These paper samples can then be tested for formaldehyde content in accordance with the formaldehyde content tests described hereinafter in the Test Methods section and for wet and dry tensile strength in accordance with test procedure ED ANA 20.2-89 or Method WSP 110.4 (EDANA 2008). The retention was calculated by dividing the wet tensile strength by the dry tensile strength, expressed as a percentage and known within the Industry as a wet/dry tensile ratio.

When such testing is carried out, the binder compositions herein will generally exhibit a "free" formaldehyde content less than 5 ppm, preferably less than 2 ppm, and a wet to dry tensile strength ratio (a.k.a. retention ratio) of greater than 30%, preferably greater than 40%. Performance gains are evident after drying, and after drying with additional cure (for example, at temperatures between 130-200° C.). For example, Whatman #1 CUR chromatography paper saturated with the composition produced as described above at a 16% add-on, dried for 15 minutes at 130° C., has a dry tensile strength of greater than 200 N/5 cm wide strip, a wet tensile strength at least 35%, preferably at least 40%, more preferably at least 45% of the dry tensile strength, and a bound formaldehyde content of less than 5 ppm as determined by the VdL-RL03(1997-05) method.

Non-Woven Substrates, Fabrics and Textiles

The compositions described hereinbefore are useful as binders and finishing agents for non-woven substrate and textiles. As used herein, a "non-woven substrate" means a web or sheet having a structure comprising individual fibers or threads which are interlaid, but not in an identifiable, repeating manner. Such non-woven fibrous webs or sheets can be conventionally formed from a wide variety of fibrous materials and by a wide variety of procedures and processes.

Fibers used to form the non-woven substrates treated with the compositions herein can be natural fibers, i.e. latex bonded airlaid [LBAL], synthetic fibers, bicomponent fibers i.e. multi bonded airlaid [MBAL], or combinations of such fiber types. Non-woven structures useful, for example, as absorbent cores in personal care products or in paper are frequently natural fibers, including those which are cellulosic in origin. Synthetic fibers and bicomponent fibers are generally fashioned from synthetic polymeric material. In some embodiments, the non-woven substrate primarily comprises cellulosic fibers, for example, a typical LBAL structure could consist of 90-70 parts dry cellulosic fibres with dry binder content between 10-30% whereas an MBAL design is likely to contain dry binder, fluff pulp and bicomponent fibres in the ratios of 6:84:10.

The non-woven substrates herein can be in the form of a structure which is airlaid or wetlaid, but also not to exclude drylaid carded. Airlaid non-woven webs can be prepared, for example, by laying down cellulosic fibres (i.e. fluff pulp) onto a conveyor wire by means of an air stream through a forming head. Bicomponent fibres can also be introduced into the fibre mix within the forming heads themselves. Wet laid substrates can include, for example, webs formed by hydrogen-bonding of cellulosic based fibres. In both cases, application of a bonding agent is quite typical to consolidate the structure and add strength plus functionality. A common wetlaid non-woven substrate is paper.

The aqueous binder compositions herein can be used to consolidate and strengthen non-woven substrates as hereinbefore described. Thus the resulting structures formed after addition of the binder compositions herein can be a latex-bonded airlaid web, a multi-bonded airlaid web, a drylaid carded web or a wetlaid web.

The binder compositions herein are generally used in a manufacturing process which produces structures in the form of a chemically-bonded web, as opposed to mechanically tangled or thermally bonded webs. Alternatively, the binder compositions herein can be used to post-treat and further strengthen mechanically tangled or thermally bonded webs which have been pre-formed in the absence of a chemical bonding agent.

In the manufacturing process for chemically bonded non-woven substrates, the binder composition can be applied to the non-woven fibrous structures described herein by any means known in the art, such as print, foam, saturation, coating, and spraying application. The binder-containing structure can then be cured, i.e., dried, on steam cans or in ovens as currently practiced in the production of non-woven rolled goods. Curing temperatures of from 100° C. to 220° C. are frequently employed. Most preferred is the spray application of the binder composition to the fibrous structure in combination with drying and curing of the resulting web using heated ovens.

Binder add-on levels for non-woven fibrous substrates herein can be from 5 to 40 wt. %, e.g., from 5 to 30 wt. %, from 5 to 20 wt. %, or from 10 to 15 wt. %, based on the total weight of the non-woven material, on a dry basis. Stated alternatively, in the treated non-woven substrates herein, the fibers of the fibrous webs comprise from 60 to 95 parts by dry weight of the treated substrate and the binder composition solids comprise from 5 to 40 parts by dry weight of the treated substrate.

The aqueous compositions herein can also be utilized as a finishing agent for woven or non-woven fabrics and textiles. When used in this manner, the compositions herein can be applied to one or both surfaces of textiles or non-woven fabrics or substrates and then subsequently cured. Finishing agent add-on levels of from 3 to 30 wt. %, on a dry basis, are frequently employed to provide full latex bonding and surface finishing plus multi-bonded structures with the finish on the upper and lower x/y surface planes only.

Treated Substrate Characteristics

The treated non-woven substrates herein have a desirable combination of relatively low formaldehyde content and relatively high tensile strength. This desirable combination of properties makes the treated substrates herein useful in a variety of contexts.

With respect to formaldehyde content, the treated substrates herein will exhibit very low formaldehyde levels even when exposed to relatively rigorous conditions which can extract bound formaldehyde as well as free formaldehyde from the treated substrate. Thus the treated substrates herein will preferably exhibit formaldehyde levels of less than 5 ppm, preferably 1 ppm or less, when tested in accordance with Japanese Ministry JM 112:1973 procedure described more fully hereinafter in the Test Methods section. Alternatively, the treated substrates herein will also preferably exhibit bound formaldehyde levels of less than 5 ppm, preferably 1 ppm or less, when tested in accordance with the VdL-RL03(1997-05) procedure also described more fully hereinafter in the Test Methods section.

With respect to tensile strength, the treated substrates herein can exhibit both good dry and wet tensile strength. Tensile strength can be determined using the Method WSP 110.4 (EDANA 2008) test procedure which is also more fully described hereinafter in the Test Methods section. The absolute tensile strength values obtained will, of course, vary widely depending upon the type of treated substrate prepared and tested. Preferably, no matter what type of non-woven substrate is treated with the binder and/or finishing agent compositions herein, the treated substrate will exhibit a wet to dry tensile strength ratio of greater than 30%, preferably greater than 40%, greater than 45%, or greater than 50%.

Substrate Uses

The treated substrates herein can be used in a wide variety of contexts wherein substrates of this type are conventionally employed. Frequently, such non-woven substrates can be utilized in ways which take advantage of their propensity to absorb and transport liquids. Thus, for example, the treated substrates herein can form part of a number of consumer products including household or industrial cleaning products and personal care products.

With respect to personal care products, the treated non-woven substrates which are chemically bonded non-woven fibrous structures can be used as both fluid acquisition/distribution elements and fluid storage elements in personal care products designed to absorb alkaline body fluids such as infant or adult urine. Thus the structures herein are useful in applications wherein wet integrity or resiliency are important, such as in, for example, infant diapers, adult incontinence articles and devices and feminine hygiene products.

The use of non-woven fibrous structures as body fluid acquisition/distribution layers (ADLs) in personal care article such as diapers is well known. Structures which perform this function are described, for example, in U.S. Pat.

Nos. 5,217,455; 5,716,703; 7,138,561; 7,767,598; and 7,786,341, all of which patents are incorporated herein by reference. The treated non-woven substrates herein can function as ADLs in analogous manner to the ADLs in such known contexts.

II. EXAMPLES

A. Test Methods
Solids Content

Solids content was measured by drying 1 to 2 grams of the aqueous dispersion at 105° C. for 4 hours, and by then dividing the weight of dried polymer by the weight of dispersion.

Viscosity

Viscosity was determined at 25° C. using a Brookfield DV-I+ Viscometer, spindle 2, speed 20 rpm.

Grit

Grit was determined by filtering 100 g of dispersion through a 40 μm filter, drying and weighing the dried grit. This was expressed as a percentage on the wet dispersion.

Glass Transition Temperature

Determination of the Glass Transition Temperature, ($T_g$), was according to ASTM E 1356 by Differential Scanning Calorimetry, (DSC), using a Mettler DSC 820 with a fluid $N_2$ cooling system. The tested range was from −80° C. to 130° C. with a heating rate of 10° C./min. The onset of the Tg range was the value which was reported.

Free Formaldehyde Content—Japanese Ministry Method JM 112:1973

Formaldehyde content of binder-containing non-woven substrates can be determined in accordance with the extraction procedures of JM 112:1973 in combination with High Performance Liquid Chromatography (HPLC) which is widely used within the absorbent non-wovens Industry. The procedure essentially extracts the HCHO in a known weight of substrate by refluxing in water for 1 hour at 40° C. followed by derivitization and quantification. The time/temperature combination can be selected to mimic conditions associated with human skin contact i.e. body temperature. HPLC is preferred over photometric techniques (i.e. absorbance at 412 nm using UV—vis.) since it only measures the HCHO based on retention time of the HCHIO in the column therefore giving a very accurate result. Furthermore, the JM 112: 1973 procedure using HPLC can be modified with extended reflux conditions from 1 hour at 40 C to 4 hours at 40 C invoking more demanding test conditions.

Bound Formaldehyde Content—VdL-RL03 Method (1997-05)

Formaldehyde content can also be determined in accordance with the procedures of the VdL-RL03 (1997-05) method. This method differs from the JM 112:1973 procedure in that is uses steam distillation under acidic conditions. Furthermore, no serum is separated before a Nash (derivitization) reactant is added. This most probably leads to higher HCHO values compared to other methods (e.g. ISO 15373 or ASTM D 5910-05), where the serum is separated first, as other aldehydes will also be derivatized and quantified in the total measured. Quantification in the VdL-RL03 (1997-05) method is done using UV-vis photometry instead of HLPC. The VdL-RL03(1997-05) method has historically been used in the paint industry where the acid is added to produce very severe test conditions designed to release all the "bound" HCHO from the components of the system.

Tensile Strength

Sample specimens for tensile testing were prepared as follows: The PAE resin was added slowly to the VAE dispersion in the ratios shown in the following tables, then water was added to give a solids content of approximately 19%. Whatman #1 filter paper sheets, commercially available from Whatman Inc., were saturated using a pad mangle to give an add-on of 17% (dry). The wet, impregnated Whatman sheets were dried in an oven at 130° C. for 15 minutes. Strips 5 cm wide were prepared and were tested either dry or after 30 minutes immersion in water. Tensile strength was measured according to Method WSP 110.4 (EDANA 2008). Quoted tensile strength values are the average of 8 measurements on specimens cut from different sheets. The retention was calculated by dividing the wet tensile strength by the dry tensile strength, expressed as a percentage.

B. Test Materials

In the following examples, PAE resins used in the examples were Maresin PST 150, Maresin M1 and Maresin T35, which are commercially available from Mare spa. Abbreviations used for monomers are: VA=Vinyl Acetate, E=Ethylene, AA=Acrylic Acid, CA=Crotonic Acid, IA=Itaconic Acid, SVS=Sodium Vinyl Sulphonate C. Preparation of VAE Dispersions Vinyl Acetate/Ethylene, (VA/E), terpolymer dispersions were prepared as shown in Examples 1-11.

Example 1: A VAIE/AA Terpolymer with Monomer Ratios 80/20/1

An aqueous solution was prepared by dissolving 125.7 g of a 70% active solution of an alcohol ethoxylate nonionic surfactant, (Emulsogen EPN 287 from Clariant GmbH), in 2307.8 g of deionized water while stirring. 48.1 g of a 25% active solution of sodium vinylsulphonate, (SVS), was added, followed by 0.24 g of ferrous sulphate heptahydrate, then the pH was adjusted to pH 4.4 by the use of phosphoric acid. Then the aqueous solution was charged to a 10-litre pressure reactor equipped with a stirrer, dosage pumps and a mass flow meter for dosing ethylene. The reactor was degassed by twice evacuating, then pressurizing with nitrogen to 2 bar, then finally evacuating.

865.4 g of vinyl acetate was pumped to the reactor, and the temperature was raised by heating to 45 C. 692.4 g of ethylene was metered to the reactor, followed by 10% of a reducer solution comprising 15.4 g of Brueggolite FF6 and 2.88 g of sodium bicarbonate dissolved in 346.2 g of deionised water.

A second aqueous solution, (Aqueous Slow-Add), was prepared comprising 247.3 g of the same nonionic surfactant dissolved in 577 g of deionized water.

When the reactor temperature stabilised at 45° C., the additions of an oxidiser solution comprising 16.5 g of 70% active t-butyl hydroperoxide dissolved in 274.6 g of deionised water and the remaining 90% of the reducer solution were commenced at a constant rate to last 300 minutes. The water jacket temperature was increased to 80° C., and the internal temperature allowed to rise by the combination of reaction and external heating.

At 55° C., the additions of a mixture comprising 57.7 g of Acrylic Acid, (AA) with 3750.2 g of VA and of the Aqueous Slow-Add solution were started to last for 240 minutes at a constant rate. At the same time, a further 461 g of ethylene was added at a rate to last 60 minutes or longer, with a pressure limit of 65 bar maximum pressure. When the reactor temperature reached 72° C., it was switched to internal temperature control, and the water jacket temperature was varied to keep the reaction temperature at 75° C. until all additions were complete.

After the additions of the oxidizer and reducer solutions were finished, the reactor was cooled to 55° C., and the contents transferred to a second vessel. When 50% had been transferred, a solution comprising 2.3 g of Brueggolite FF6, 0.58 g of Agitan 282 defoamer and 0.12 g of ferrous sulphate heptahydrate in 57.7 g of deionised water was added over 5 minutes. Once all of the reactor contents were transferred and the pressure was below 1 bar, a solution comprising 1.65 g of t-butylhydroperoxide and 3.85 g of 30% active hydrogen peroxide in 57.7 g of deionised water was added, and the temperature was kept at 50° C. for 30 minutes. The vessel was cooled, the contents discharged, and the resultant dispersion was filtered through a 180μ mesh. The resultant dispersion had a solids content of 60.0%, viscosity of 214 mPa·s, pH of 5.4, grit, (measured on a 40μ mesh), of 0.1% and a Tg, (onset, by DSC), of −8.1° C.

Example 2: A VA/E/CA Terpolymer with Monomer Ratios 80/20/1

A similar procedure was followed as for Example 1, except that the Crotonic Acid, (CA), was dissolved in the Aqueous Slow-add solution and not in the VA. The resultant dispersion had a solids content of 59.5%, viscosity of 254 mPa·s, pH of 5.6, grit of 0.01% and a Tg, (onset, by DSC), of −6.4° C.

Example 3: A VA/E/IA Terpolymer with Monomer Ratios 80/20/1

A similar procedure was followed as for Example 1, except that the Itaconic Acid, (IA), was dissolved in the Aqueous Slow-add solution and not in the VA. The resultant dispersion had a solids content of 60.1%, viscosity of 274 mPa·s, pH of 4.7, grit of 0.007% and a Tg, (onset, by DSC), of −8.0° C.

Example 4: A VA/E/AA Terpolymer with Monomer Ratios 80/20/2

A similar procedure was followed as for Example 1, except that AA level was increased to 114.7 g. The resultant dispersion had a solids content of 60.3%, viscosity of 230 mPa·s, pH of 5.0, grit, (measured on a 40μ mesh), of 0.02% and a Tg, (onset, by DSC), of −5.9° C.

Example 5: A VA/E/IA Terpolymer with Monomer Ratios 80/20/2

A similar procedure was followed as for Example 3, except that the IA level was increased to 114.7 g. The resultant dispersion had a solids content of 59.8%, viscosity of 410 mPa·s, pH of 5.0, grit of 0.02% and a Tg, (onset, by DSC), of −8.0° C., Example 6: A VA/E/CA Terpolymer with Monomer Ratios 80/20/1

This was a repeat of Example 2. The resultant dispersion had a solids content of 57.8%, viscosity of 290 mPa·s, pH of 5.6, grit of 0.04% and a Tg, (onset, by DSC), of −7.2° C.

Example 7: A VA/E/CA Terpolymer with Monomer Ratios 80/20/1

This was a process modification of Example 2, where the jacket temperature was fixed and the oxidizer and reducer addition rates allowed to vary to maintain the reaction temperature. The resultant dispersion had a solids content of 59.0%, viscosity of 290 mPa·s, pH of 5.6, grit of 0.02% and a Tg, (onset, by DSC), of −5.9° C.

Example 8: VA/E/AA/CA Terpolymer with Monomer Ratios 80/20/0.5/0.5

A similar procedure was followed as for Example 1, except that half of the AA was replaced by CA, (which was dissolved in the Aqueous Slow-add solution and not in the VA). The resultant dispersion had a solids content of 58.9%, viscosity of 310 mPa·s, pH of 5.5, grit of 0.06% and a Tg, (onset, by DSC), of −8.1° C.

Example 9: A VA/E/CA Terpolymer with Monomer Ratios 80/20/1

A similar procedure was followed as for Example 1, except that the initial water phase contained no SVS, only 83.2 g of the nonionic surfactant and 93.9 g of an anionic half-ester sulphosuccinate surfactant, (Rewopol SB FA 50 from Evonik). The resultant dispersion had a solids content of 58.8%, viscosity of 280 mPa·s, pH of 5.2, grit of 0.1% and a Tg, (onset, by DSC), of −6.7° C.

Example 10: A VA/E/CA Terpolymer with Monomer Ratios 80/20/1

A similar procedure was followed as for Example 1, except that the initial water phase contained 2779 g of deionized water and an additional 48.1 g of SVS was added to the Aqueous Slow-Add. The resultant dispersion had a solids content of 55.2%, viscosity of 78 mPa·s, pH of 5.9, grit of 0.03% and a Tg, (onset, by DSC), of −6.0° C.

Example 11: A VA/E/CA Terpolymer with Monomer Ratios 80/20/1

A similar procedure was followed as for Example 1, except that the initial water phase contained 2769 g of deionized water and 153 g of the alcohol ethoxylate nonionic surfactant, and the aqueous slow-add contained 229.5 g of the alcohol ethoxylate nonionic surfactant. As a final step the dispersion was stripped using a rotary evaporator, (Rotavapr R-220 SE, from Buchi), to reduce the total VOC's, (Volatile Organic Compounds), to below 1000 ppm. The resultant dispersion had a solids content of 56.3%, viscosity of 254 mPa·s, pH of 5.0, grit of 0.02% and a Tg, (onset, by DSC), of −7.3° C.

Comparative Example 1

Elite 20, a state of the art, low-formaldehyde VAE dispersion utilizing NMA cross-linking and commercially available from Celanese was used as the comparison in all of the testing. Elite 20 has a solids content of 50%, an average viscosity of 250 mPas, and a $T_g$, (onset by DSC), of −6° C.

Example 12

Test sheets were prepared and tested as described above, using blends of Maresin PST 150 with various VAE dispersions at a ratio of VAE to PAE of 50/50, on a dry basis. Results are shown in Table 1.

TABLE 1

Tensile Strength of VAE Resins with PST 100 at a 50/50 ratio

| VAE | Example 1 | Example 2 | Example 3 | Example 4 | Example 5 | Comparative Example 1 |
|---|---|---|---|---|---|---|
| Dry, (N/5 cm) | 203.6 | 202.6 | 201.0 | 196.9 | 171.2 | 184.2 |
| Wet, (N/5 cm) | 106.3 | 104.1 | 98.9 | 83.5 | 80.1 | 105.6 |
| Retention, (%) | 52.2 | 51.4 | 49.2 | 42.4 | 46.8 | 57.3 |

Example 13

Test sheets were prepared and tested as described above, using blends of VAE of Examples 2, 3 and 5 with different PAE resins at a ratio of VAE to PAE of 50/50, on a dry basis. Results are shown in Table 2.

TABLE 2

Tensile strength of CA and IA containing VAE dispersions with different PAE resins at a 50/50 ratio

| VAE | PAE | Dry (N/5 cm) | Wet (N/5 cm) | Retention (%) |
|---|---|---|---|---|
| Example 2 | PST 150 | 211.9 | 99.0 | 46.7 |
| Example 2 | M1 | 237.6 | 123.5 | 52.0 |
| Example 2 | T35 | 218.0 | 87.6 | 40.2 |
| Example 3 | PST 150 | 220.6 | 86.1 | 39.0 |
| Example 3 | M1 | 238.4 | 116.4 | 48.8 |
| Example 3 | T35 | 225.4 | 100.7 | 44.7 |
| Example 5 | PST 150 | 217.5 | 122.0 | 56.1 |
| Example 5 | M1 | 210.4 | 106.5 | 50.6 |
| Example 5 | T35 | 228.7 | 120.4 | 52.6 |
| Comparative Example 1 | — | 212.1 | 106.2 | 50.1 |

Example 14

Test sheets were prepared and tested as described above, using blends of crotonic acid (CA) containing VAE's with Maresin M1, at a ratio of VAE to PAE of 50/50 on a dry basis. Results are shown in Table 3.

TABLE 3

Tensile strength of CA containing VAE dispersions with Maresin M1 at a 50/50 ratio

| VAE | Example 2 | Example 6 | Example 7 | Example 8 | Example 9 | Comparative Example 1 |
|---|---|---|---|---|---|---|
| Dry, (N/5 cm) | 227.1 | 226.6 | 232.9 | 230.3 | 227.8 | 220.3 |
| Wet, (N/5 cm) | 112.5 | 109.7 | 113.2 | 116.2 | 113.6 | 116.1 |
| Retention, (%) | 49.5 | 48.4 | 48.8 | 50.5 | 49.9 | 52.7 |

Example 15

Test sheets were prepared and tested as described above, using blends of a crotonic acid containing VAE with Maresin M1, at different VAE to PAE ratios on a dry basis. Results are shown in Table 4.

TABLE 4

Tensile strength of CA containing VAE dispersion Example 10 with Maresin M1 at different ratios

| VAE/PAE ratio | 75/25 | 70/30 | 65/35 | 60/40 | 55/45 | Comparative Example 1 |
|---|---|---|---|---|---|---|
| Dry, (N/5 cm) | 204.3 | 206.6 | 208.0 | 219.8 | 216.6 | 215.0 |
| Wet, (N/5 cm) | 105.8 | 107.1 | 111.3 | 114.3 | 116.4 | 112.4 |
| Retention, (%) | 51.8 | 51.8 | 53.5 | 52.0 | 53.7 | 52.3 |

Example 16

Test sheets were prepared and tested as described above, using blends of a crotonic acid containing VAE with Maresin M1, at 70:30 VAE to PAE ratio on a dry basis at different pH values. Results are shown in Table 5.

TABLE 5

Tensile Strength of CA containing VAE dispersion Example 10 and Example 11 with Maresin M1 at 70:30 ratio at different pH values

| VAE | Example 10 | Example 10 | Example 11 | Example 11 | Comparative Example 1 |
|---|---|---|---|---|---|
| pH value | 8.1 | 8.6 | 8.1 | 8.7 | 4 |
| dry strengths (N) | 230.8 | 230.8 | 235.2 | 242.9 | 221.8 |
| wet strengths (N) | 118.0 | 123.3 | 119.2 | 128.9 | 115.4 |
| Ratio | 51% | 53% | 51% | 53% | 52% |

Example 17

Samples of the wet VAE Example 11 of the wet blend VAE Example 11/Maresin M1 at a 60/40 ratio, sheets prepared as described above using VAE in Example 10, the blend VAE in Example 11/Maresin M1 in ratio 60:40 were sent for determination of free formaldehyde in textiles and polymer dispersions according to JM 112 modified by using HPLC to separate the formaldehyde. Results are shown in Table 6.

TABLE 6

Latex, free and bound formaldehyde levels in VAE dispersion Example 10 and of blend VAE Example 10/Maresin M1 at a 60/40 ratio

|  | Example 11 | Example 11: Maresin M1 ratio 60/40 | Comparative Example 1 (Elite 20) |
|---|---|---|---|
| Wet Latex Formaldehyde (ppm) | 13 | 5 | 67 |
| Sheet[1] (extractable, free) Formaldehyde (ppm) | 3 | 2 | 17 |
| Bound [2] Formaldehyde (ppm) in 100% solids dried film |  | <5 | >300 |

Sheet[1]: method is based on Japanese Ministry procedure but with High Performance Liquid Chromatography (HPLC) and photometric quantification where HPLC is used to accurately separate the free HCHO
Bound [2]: VdL-RL03 test method

III. EMBODIMENTS

Embodiments of the present invention include a low-formaldehyde containing dispersion of a vinyl ester/ethylene copolymer containing copolymerized carboxylic acid groups or salts thereof blended with a wet strength polyamidoamine-epichlorohydrin, (PAE) resin; wherein: a) the vinyl ester/ethylene copolymer dispersion is free of reactive N-methylol acrylamide groups; b) the PAE comprises less than 1500 ppm halogenated organic compounds, (AOX); c) the weight ratio of the vinyl ester/ethylene copolymer to the PAE resin is from 95:5 to 20:80; and d) the pH is greater than 6, preferably greater than 7, more preferably greater than 7.5. The vinyl ester/ethylene copolymer may contain from 5 to 35 wt. %, preferably from 10 to 30 wt. %, more preferably from 15 to 25 wt. % of units derived from ethylene. The vinyl ester component of the copolymer may comprise a vinyl ester of a $C_1$-$C_3$ saturated carboxylic acid and is preferably vinyl acetate. The dispersion may be used as a binder for a textile or non-woven substrate, wherein the dispersion has been applied to one or both sides of the textile or non-woven fabric and then cured.

Embodiments of the present invention also include a composition produced by blending the vinyl ester/ethylene copolymer dispersion and a PAE resin according to any of the claims 1 to 2, wherein the vinyl ester is vinyl acetate and wherein when Whatman #1 CHR chromatography paper is saturated with the composition at a 16% add-on, dried for 15 minutes at 130° C., the treated Whatman paper has a dry tensile strength of greater than 200 N/5 cm wide strip, a wet tensile strength at least 35%, preferably at least 40%, more preferably at least 45% of the dry tensile strength, and a bound formaldehyde content of less than 5 ppm as determined by the VdL-RL03 method (1997-05). The composition may be used as a binder for a textile or non-woven substrate, wherein the composition has been applied to one or both sides of the textile or non-woven fabric and then cured.

Embodiments of the present invention further include a latex-bonded non-woven material comprising a substrate, wherein the substrate is bonded with a polymer binder comprising a vinyl ester/ethylene copolymer and a wet strength polyamidoamine-epichlorohydrin, (PAE), resin; wherein: a) the non-woven material has a wet tensile strength value of at least 35%, preferably 40% of its dry tensile strength value; and b) the material has a bound formaldehyde content of less than 5 ppm as determined by the VdL-RL03 (1997-05) method, and c) the material has a free formaldehyde content of less than 5 ppm as determined using the JIM 112; 1973 method. The weight ratio of dried VAE/PAE blend to the weight of the fibers may be from 3 to 30 wt. %, preferably from 5 to 20 wt. %, more preferably from 10 to 15 wt. %. The weight ratio of the vinyl ester/ethylene copolymer to PAE resin may be from 95:5 to 20:80. The wet/dry tensile strength ratio of the material may be at least 40%, preferably at least 45% and the bound formaldehyde is less than 5 ppm, preferably 1 ppm or less. The PAE may be a so-called G2, G2.5 or G3 PAE resin, and is an aqueous solution with solids content from 12.5 to 30%, wherein the level of undesired byproducts has been reduced such that the level of 1,3-dichloropropanol, (DCP) is below 700 ppm, preferably below 500 ppm, more preferably below 150 ppm, most preferably below 50 ppm, the level of 3-monochloropropan-1,2-diol, (MCPD), is below 600 ppm, preferably below 500 ppm, more preferably below 400 ppm and most preferably below 50 ppm and the AOX level is below 1300 ppm, preferably below 800 ppm. The vinyl ester component of the VAE copolymer may comprise a vinyl ester of a $C_1$-$C_{13}$ saturated carboxylic acid and is preferably vinyl acetate. The VAE copolymer may comprise 0.1 to 10 wt. %, preferably 0.25 to 5 wt. %, more preferably 0.5 to 2.5 wt. % of units derived from at least one ethylenically unsaturated acid and/or anhydride thereof and/or salt thereof. The ethylenically unsaturated acid may comprise an α-β unsaturated mono- or di-carboxylic acid containing 3 to 8 carbon atoms. The α-β unsaturated mono- or di-carboxylic acid monomer may be one or more of acrylic acid, methacrylic acid, crotonic acid, itaconic acid, maleic acid and C1 to C12 mono-alkyl esters of itaconic or maleic acid. The VAE copolymer of the polymer binder may be substantially free of anionic stabilization agent, wherein substantially free means less than 2 wt. % of anionic surfactant on an active basis, preferably less than 1 wt. %. The VAE copolymer of the polymer binder may comprise a nonionic surfactant. The VAE copolymer may comprise a protective colloid. The protective colloid may be polyvinyl alcohol or hydroxyethyl cellulose. The VAE copolymer of the polymer binder may comprise a combination of protective colloid and non-ionic surfactant. The VAE copolymer of the polymer binder may be substantially free of n-methylol acrylamide and alkyl esters of n-methylol acrylamide. The fibres used to form the non-woven material may be selected from natural fibres, synthetic fibres, bicomponent fibres and combinations thereof. The fibers used may primarily comprise cellulosic fibers. The non-woven material may be a latex-bonded airlaid web, a multi-bonded airlaid web, a drylaid carded web or a wetlaid web.

Embodiments of the present invention also include the use of the non-woven material as described in the above embodiments, wherein the non-woven material is used, either alone or fabricated into a structure, to absorb liquids.

Embodiments of the present invention also include the use of the non-woven material as described in the above embodiments as a fluid acquisition/distribution element or a fluid storage element of a personal care article.

Embodiments of the present invention also include a personal care article incorporating the non-woven material described in the above embodiments.

Embodiments of the present invention also include a household or industrial cleaning cloth or wipe incorporating the non-woven material described in the above embodiments.

While the invention has been described in detail, modifications within the spirit and scope of the invention will be readily apparent to those of skill in the art. It should be understood that aspects of the invention and portions of various embodiments and various features recited above and/or in the appended claims may be combined or interchanged either in whole or in part.

In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

We claim:

1. A latex-bonded non-woven material comprising a substrate; wherein:
    a) the substrate is bonded with a polymer binder comprising a vinyl ester/ethylene copolymer and a wet strength polyamidoamine-epichlorohydrin, (PAE), resin;
    b) the weight ratio of vinyl ester/ethylene copolymer to PAE resin is from 75:25 to 40:60;
    c) the non-woven material has a wet tensile strength value of at least 35% of its dry tensile strength value; and
    d) the material has a bound formaldehyde content of less than 5 ppm as determined by the VdL-RL03 (1997-05) method; and
    e) the material has a free formaldehyde content of less than 5 ppm as determined using the JM 112; 1973 method.

2. The latex-bonded non-woven material of claim 1, wherein the weight ratio of dried vinyl ester/ethylene copolymer to PAE blend to the weight of the fibers is from 3 to 30 wt. %.

3. The non-woven material of claim 1, the PAE comprises less than 1500 ppm halogenated organic compounds.

4. The non-woven material of claim 1, wherein the wet/dry tensile strength ratio of the material is at least 40% and the bound formaldehyde is less than 5 ppm.

5. The non-woven material of claim 1, wherein the PAE is a so-called G2, G2.5 or G3 PAE resin, and is an aqueous solution with solids content from 12.5 to 30%, wherein the level of undesired byproducts has been reduced such that the level of 1,3-dichloropropanol, (DCP) is below 700 ppm, the level of 3-monochloropropan-1,2-diol, (MCPD), is below 600 ppm.

6. The non-woven material of claim 1, wherein the vinyl ester/ethylene copolymer of the polymer binder is substantially free of anionic stabilization agent, wherein substantially free means less than 2 wt. % of anionic surfactant on an active basis.

7. The non-woven material of claim 1, wherein the vinyl ester/ethylene copolymer of the polymer binder comprises a nonionic surfactant, a protective colloid, or combinations of a nonionic surfactant and a protective colloid.

8. The non-woven material of claim 1, wherein the VAE copolymer of the polymer binder is substantially free of n-methylol acrylamide and alkyl esters of n-methylol acrylamide.

9. The non-woven material of claim 1, wherein the fibres used to form the non-woven material are selected from natural fibres, synthetic fibres, bicomponent fibres or combinations thereof.

10. The non-woven material of claim 1, wherein the vinyl ester is vinyl acetate.

11. The non-woven material of claim 1, wherein the non-woven material is a latex-bonded airlaid web, a multi-bonded airlaid web, a drylaid carded web or a wetlaid web.

12. A personal care article incorporating the non-woven material of claim 1.

13. A household or industrial cleaning cloth or wipe incorporating the non-woven material according to claim 1.

* * * * *